C. MACUMBER.
MACHINE FOR DRAINING SUGAR.
No. 66,241. Patented July 2, 1867.
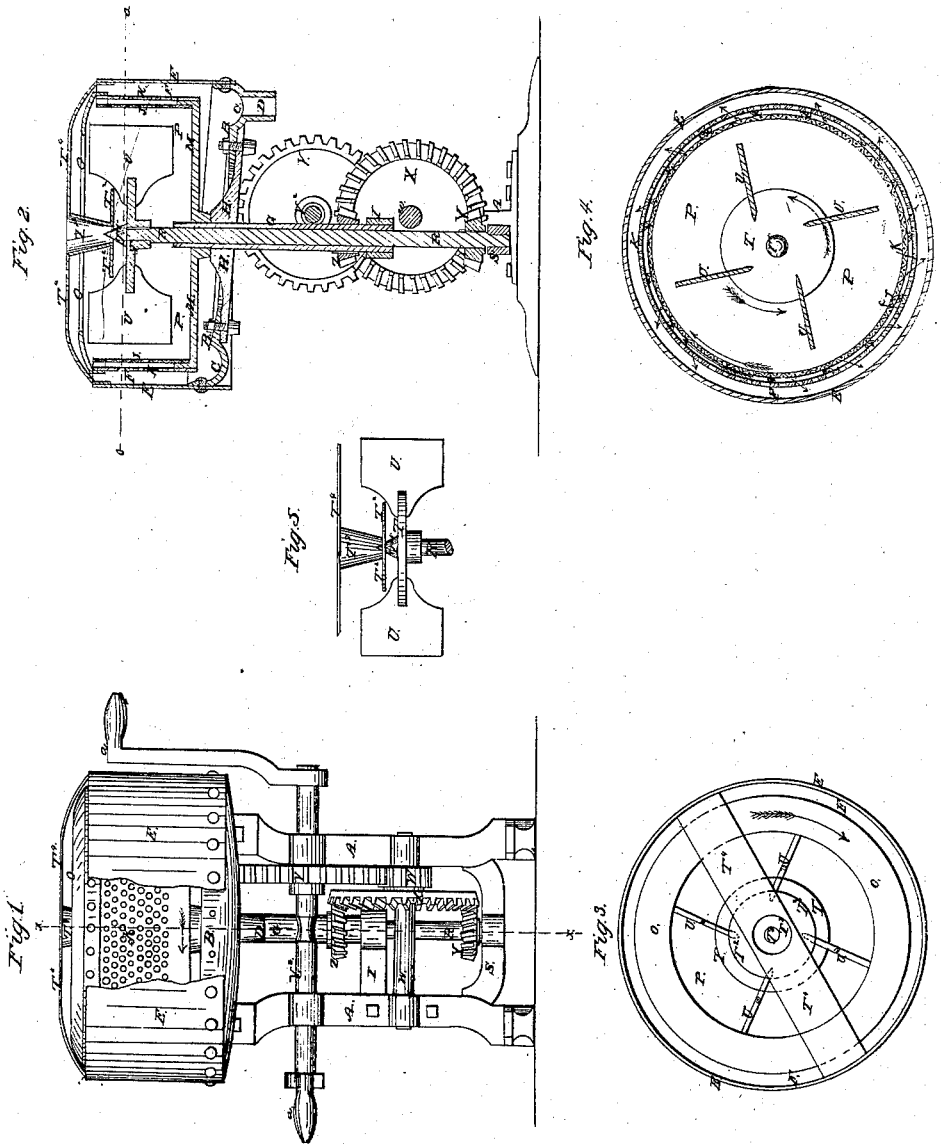

United States Patent Office.

CASSIUS MACUMBER, OF AURORA, ILLINOIS.

Letters Patent No. 66,241, dated July 2, 1867.

---

IMPROVEMENT IN MACHINES FOR DRAINING SUGAR.

---

The Schedule referred to in these Letters Patent and making part of the same.

---

TO ALL WHOM IT MAY CONCERN:

Be it known that I, CASSIUS MACUMBER, of Aurora, in the county of Kane, and State of Illinois, have invented certain new and useful improvements in Centrifugal Machines for Draining Sugar; and I do hereby declare the following to be a full, clear, and exact description thereof, reference being had to the annexed drawings of the same, which make part of this specification, and in which—

Figure 1 represents a side elevation of the machine, embracing my improvements.
Figure 2 represents a vertical section of the same, taken at the line $x\ x$ of fig. 1.
Figure 3 represents a top view of the machine.
Figure 4 represents a horizontal section, taken at the line $o\ o$ of fig. 2.
Figure 5 represents in elevation the fixed and revolving disks detached from the machine.

In the accompanying drawings, A represents a metallic frame, upon which the receiving and draining apparatus and the gearing are mounted. This frame is braced and supported in any suitable manner. A cast-iron base-plate, B, is fixed upon the frame A, having a circular trough, C, formed round its circumference to receive the sirup, and to insure its proper discharge. This trough is inclined, and is provided with an opening, D, at its lowest side, through which the sirup escapes. To the circumference of this circular base a fixed sheet-iron curb, E, of suitable depth and diameter, is secured. Within this fixed curb is placed a revolving separator of less diameter, so as to leave an annular space, F, between them. This separator is supported by and secured to a vertical hollow shaft, G, having its bearings in a cross-piece, H, of the fixed base, and a bracket, I, of the supporting frame, so as to leave a space between the bottom of said separator and the trough C of the base-plate. This separator is caused to revolve to the right, and is composed of two separating surfaces—an inner one, J, and an outer one, K—forming a series of chambers between them. These separating surfaces are vertical, and secured at their lower edges to the circumference of a bottom plate, M, keyed fast to the hollow shaft G, and at their upper edges to an open cap-plate, O, forming a receiver, P. The outer one of these screens is made of heavy smoke-stack iron, and is perforated with holes of suitable size, and the inner screen J is made of wire cloth or other suitable material, the meshes of which are much finer than those of the outer screen K, and the chamber between these screens is divided by inclined partitions $c$, the object of which will be presently described. A solid shaft, R, passes through the hollow shaft G, and extends both above and below it, and is stepped into and supported by a brace-bar, S, at the bottom of the frame, while its upper end extends into the receiving-chamber P, just midway between the top and bottom. Upon the upper end of this shaft is mounted a horizontal circular disk, T, of a diameter about equal to half that of the receiving-chamber, and it is provided with four vertical parallel wings U, which project equally above and below the disk, leaving a sufficient space between their lower edges and the bottom of the receiver for the unobstructed deposit of the sugar, and a sufficient space between their outer edges and the inner screen for their proper action. The disk T and its beaters revolve to the left, and the beaters U are not placed radial to the disk, but tangential to a circle greater than half the diameter of the disk, so that the beaters present an oblique surface to the inner screen, which I have found to be much better than placing them radial, because, when so placed, their tendency is to carry the sirup continuously round, but placed as described, they assist the centrifugal action, and throw the sirup outward. The sirup is received upon the disk and thrown outward in a horizontal sheet, and the beaters strike it and turn it into a vertical sheet, throwing it equally against the screen. The two screens which form the separator, and through which the sirup passes, are not placed close together, so that the one adjoins the other, for that has already been done without relieving the constant tendency to clog, but I place them a suitable distance apart, and strengthen and support them by a series of partitions, $c$, placed at equal distances apart between the two screens, at an angle tangential to a circle concentric with the disk T, so that they shall present inclined surfaces to the air as the screens revolve. The partitions thus arranged form a series of chambers between the two screens, through which the sirup passes, and the inclined positions of these partitions cause the sirup to be discharged from the outer screen in a direction opposite to the rotation of the separator, as indicated by the arrows in fig. 4, and falls into the trough C, and the sugar being thus quickly rendered light and dry, falls upon the bottom of the receiver P. This keeps the separator clear, because, in addition to the blast from the beaters through the meshes of the screens, each chamber creates an outward draught, by the action of the air against the inclined sides of the partitions. A revolving separator thus constructed of a series of draught-chambers possesses the requisite strength so necessary to a rapidly-revolving screen, while, at the same time, its meshes are kept free, and the sirup is separated from the sugar the moment it strikes the inner screen. In centrifugal draining machines it is of the first importance to obtain an equal distribution of the sirup against the screen—that is to say, in a thin sheet instead of a thick stream—and various devices have been contrived to effect this result, none of which, so far as I know, serves the purpose effectually. In my machine the sirup is introduced upon a rapidly revolving disk, which of itself I have found not to answer the desired purpose, and I have therefore combined with this revolving disk, a fixed disk, $T^2$, placed immediately above it, and suspended by a funnel-shaped receiver, $T^3$, attached to a plate, $T^4$, fastened to the fixed curb. Between these two disks I place a small cone, $T^5$, fixed to the revolving disk and projecting above the fixed disk into the funnel receiver. By this construction the sirup is fed into the funnel upon the small cone $T^5$, which directs it outward equally on all sides to the circumference of the revolving disk, while the fixed disk $T^2$ prevents its splashing upward, and assists the action of the cone $T^5$, in causing it to pass rapidly outward in a thin sheet to the beaters. The space between the cone and the receiving funnel must be sufficient to allow the sirup to pass freely downward, and the space between the fixed and revolving disks must be such as to allow the proper action of the cone and beaters. The gearing consists of a cog-wheel, V, mounted upon a horizontal shaft, $V^2$, secured in bearings in the frame, and having at each end a crank handle, $a\ a$, by which it is turned, and a pinion, W, into which said wheel V matches, mounted upon a horizontal shaft, $w$, secured in bearings directly beneath the driving-shaft. Upon this pinion-shaft is also mounted a bevel-wheel, X, into which engage two bevel-pinions, Y and Z, arranged one above the other—the lower one, Y, upon the end of the shaft which carries the disk and beaters, and the upper one, Z, upon the lower end of the hollow shaft which carries the separator. To effect this, however, and obtain the opposite motions for the disk and separator, the horizontal shafts V W must be placed to one side of the vertical shafts; in which case, it will be seen, the ordinary radial gear-teeth of the bevel-wheel and pinions will not match. To obviate this, the teeth of the bevel-wheel are set obliquely, and the teeth of the pinions are also set obliquely, so as to match with the teeth of the bevel-wheel. The diameter of the several wheels must be such as to produce a uniform motion of the separator and beaters, and the proper velocity. The fixed and revolving disks are secured in such manner as to allow their removal in order to remove the sugar from the receiver when necessary.

Having thus described my improvements, I claim—

1. Constructing the revolving separator of a series of draught-chambers, by means of the inclined partitions, substantially as described.

2. The arrangement and combination of the revolving and fixed disks T $T^2$, and cone $T^5$, for the purpose and in the manner substantially as described.

3. Placing the beaters obliquely on the revolving disk for the purpose described.

In testimony whereof I have hereunto signed my name.

CASSIUS MACUMBER.

Witnesses:
 L. D. TARBLE,
 JOHN EDDY.